UNITED STATES PATENT OFFICE.

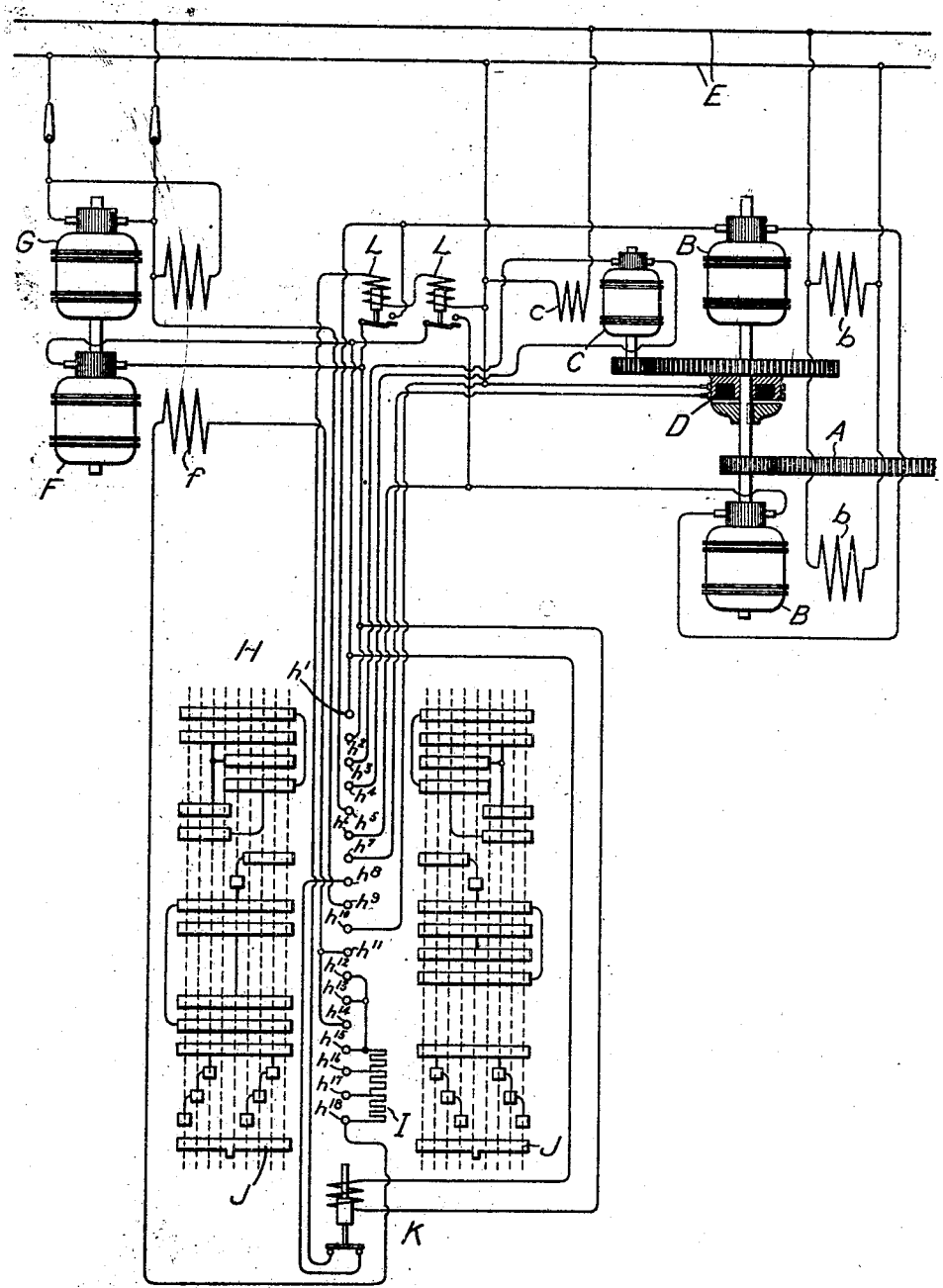

WILBUR L. MERRILL, OF SCHENECTADY, NEW YORK, ASSIGNOR TO GENERAL ELECTRIC COMPANY, A CORPORATION OF NEW YORK.

SYSTEM OF MOTOR CONTROL.

No. 873,064.

Specification of Letters Patent.

Patented Dec. 10, 1907.

Application filed April 6, 1907. Serial No. 366,679.

*To all whom it may concern:*

Be it known that I, WILBUR L. MERRILL, a citizen of the United States, residing at Schenectady, county of Schenectady, State of New York, have invented certain new and useful Improvements in Systems of Motor Control, of which the following is a specification.

My invention relates to the control of electric motors, and particularly to control systems in which a plurality of motors are employed to drive a load at different speeds.

In certain cases, as, for instance, in the operation of turrets on battleships and of printing-presses, which must be operated over a wide range of speed, it has been proposed heretofore to employ two motors; one of which is of small capacity and is connected to the load through low-speed gearing, while the other motor is larger and is connected to the motor through high-speed gearing. By impressing a low voltage on the smaller or low-speed motor, and gradually increasing it, and then impressing a low voltage on the high-speed motor and gradually increasing it, the load may be driven over a wide range of speeds.

A convenient method of securing the variable voltage for operating the motors, consists in varying the field strength of the generators supplying the motors, but with control devices heretofore employed, this method of supplying the motors has a serious disadvantage, since, when the transition is made from low-speed to the high-speed motor, the impressed voltage must be reduced from maximum to minimum, in order to prevent a rush of current and shock to the apparatus, but the field-strength of the generator does not fall immediately, when the current through the field is reduced, so that if a quick transition is made from one motor to the other, a comparatively high voltage will be impressed on the high-speed motor when it is first thrown into circuit. This will produce an excessive rush of current and a sudden acceleration of the load.

My invention consists in providing means for preventing a sudden movement of the controlling switch in changing from one motor to another. I accomplish this by providing a magnet connected in shunt to the generator, and consequently responsive to variations in the generator voltage, and a lock controlled by the magnet arranged to engage the controlling switch when the switch is moved to change from one motor to the other. The lock is released automatically when the voltage of the generator falls low enough so that the generator may be connected to the high-speed motor without an undue rush of current.

The controlling-switch contacts are preferably so arranged that in the position in which the switch is locked the low-speed motor is disconnected from the load, while the high-speed motor has its circuit still open. Consequently, if the switch were left in this position, the load would come to rest. To prevent this, I provide means controlled by the locking magnet for connecting the high-speed motor to the generator, independently of the controlling switch, as soon as the generator voltage falls low enough to permit of such connection without an excessive current flow.

My invention will best be understood by reference to the accompanying drawing, which shows diagrammatically a control system arranged in accordance with my invention.

In the drawing A represents a driven-member, which is shown as a gear engaging a pinion on a shaft which carries two motor armatures B B. These motors coöperate to drive the load at high-speed.

C represents the armature of a small motor, which is connected to the shaft of the motors through a pinion and gear and a magnetic clutch D. The fields $b$ $b$ of the large motors and the field $c$ of the small motor may be supplied directly from the constant potential mains E. The armatures are supplied from the armature F of an electric generator, which may be driven at a constant speed by the shunt motor G connected to the constant potential mains E. The field $f$ of this generator is connected to the mains through a controlling switch H, which comprises a resistance I, by which the field strength of the generator may be varied so as to control the voltage supplied to the motors. The controlling switch comprises stationary contacts $h^1$ to $h^{18}$. The movable portion of the switch carries, in addition to the movable contacts, plates J J, each of which has a downwardly extending lug adapted to be engaged by an upwardly extending stem on the core of a magnet K when the magnet is energized. The core of magnet K is provided with a contact which controls the magnets L L, which are arranged to connect the motor armatures B B to the generator independently of the controlling switch H.

When the controlling switch H is moved so as to bring the right-hand contacts into engagement with the stationary contact fingers, the armature C of the small or low speed motor is connected to the generator armature through contacts $h^1$ to $h^4$. At the same time the field circuit of the generator is closed. This circuit may be traced as follows:—from the upper main E to contact $h^9$, contact $h^{12}$, resistance I, field $f$, thence through contacts $h^{11}$ and $h^{10}$, to the lower main E. All of the resistance I is included in circuit with the field winding, so that the generator voltage is low. The motor C starts and drives the load at a low speed, since the circuit of the magnetic clutch D is closed. This circuit may be traced from the lower line-wire E, through the magnetic clutch, and contacts $h^7$ and $h^9$, to the upper main E. As the movement of the switch H is continued, resistance I is gradually short-circuited by contacts $h^{15}$, $h^{16}$, $h^{17}$, and $h^{18}$, thereby increasing the voltage impressed on the armature C, and consequently increasing its speed. When the resistance I is all short circuited, the motor is operating at its maximum speed. If the movement of the controlling switch H is continued beyond this point, the circuit of the magnetic clutch D is opened at contact $h^7$, and the short circuit around resistance I is opened at contact $h^{18}$. At the same instant, the downwardly-extending lug on the plate J engages and is stopped by the upwardly projecting stem on the core of magnet K, since the core has been raised by the magnet, as the generator voltage, which is now at its maximum value is impressed on the terminals of the magnet. Although resistance I is again cut into the field circuit of the generator, the generator voltage does not immediately fall, so that if the movement of the switch H were continued, so as to connect the generator to the motors B B, a heavy rush of current would follow, but the energization of magnet K prevents the continued movement of the switch until the generator voltage has fallen sufficiently to cause magnet K to drop its core; thereby releasing switch H, and allowing the movement of the switch to be continued. A further movement of the switch closes a circuit from motors B B to generator F, through contacts $h^1$, $h^2$, $h^5$ and $h^6$. The minimum voltage of the generator is now impressed on motors B B. The gearing between motor C and motors B B is so designed that the speed of motors B operating on minimum voltage is practically the same as that of motor C on maximum voltage multiplied by the gear ratio, so that the transition from motor C to motors B B is accomplished without a shock to the load. Further movement of switch H gradually short circuits resistance I, thereby gradually increasing the speed of motors B up to their maximum value. The armature circuit of the motor C may be left closed, so that the motor runs idle, or may be broken at contacts $h^3$ and $h^4$ after the lug on plate J has passed the stem of magnet K. On the reverse movement of switch H the speed of the load is gradually decreased.

It will be seen that since at the point where the switch H is locked by the core of magnet K the circuit of clutch D has been broken, while the circuit of motors B B has not been closed, the load is not being driven by either the low speed or high speed motor. Consequently, if the switch were left in the position at which it is locked, the load would slow down. In order to prevent this, I provide the magnets L L, which are controlled by a contact on the core of magnet K. As soon as the generator voltage falls sufficiently to cause magnet K to drop its core, the circuit of the magnets L L is closed. This circuit may be traced as follows: from the lower mains E, through the magnets L L and contact of magnet K, to contacts $h^8$ and $h^9$ and thence to upper main E. These magnets L L are consequently energized and close their contacts as soon as magnet K releases its core; thereby connecting armatures B B directly to the generator independently of the switch H. Consequently, even if the movement of switch H is not continued after its release by the magnet K, motors B B will be connected to the generator as soon as the voltage of the generator falls sufficiently to permit the connection. Whenever the movement of switch H is continued and the circuit of motor armatures B B closed through contacts $h^5$ and $h^6$, the circuit of magnets L L is broken at contact $h^8$.

The left hand movable contacts of switch H are arranged like the right hand contacts, except that the connection of generator field $f$ to the mains is reversed, so as to reverse the direction of rotation of the motors.

What I claim as new and desire to secure by Letters Patent of the United States, is,

1. In combination with a load to be driven, an electric motor for driving the load at low speed, a second electric motor for driving the load at high speed, a common source of current for the motors, controlling means adapted to connect the first motor to the source and gradually to increase the voltage of the source and then to lower the voltage of the source and connect the second motor thereto, and means for preventing a sudden operation of said controlling means in changing from one motor to the other.

2. In combination with a load to be driven, an electric motor for driving the load at low speed, a second electric motor for driving the load at high speed, a common source of current for the motors, controlling means adapted to connect the first motor to the source and gradually to increase the voltage of the source and then to lower the voltage of the source and connect the second motor thereto, and means controlled by the voltage of the source controlling the operation of said controlling means in changing from one motor to the other.

3. In combination with a load to be driven, an electric motor for driving the load at low speed, a second electric motor for driving the load at high speed, a common source of current for the motors, controlling means adapted to connect the first motor to the source and gradually to increase the voltage of the source and then to lower the voltage of the source and connect the second motor thereto, and a magnet connected in shunt to said source controlling the operation of said controlling means in changing from one motor to the other.

4. In combination with a load to be driven, an electric motor for driving the load at low speed, a second electric motor for driving the load at high speed, a common source of current for the motors, a controlling switch adapted to connect the first motor to the source and gradually to increase the voltage of the source and then to lower the voltage to the source and connect the second motor thereto, a magnet connected in shunt to said source, and a lock controlled by said magnet adapted to engage said switch when said switch is moved to change from one motor to the other.

5. In combination with a load to be driven, an electric motor for driving the load at low speed, a second electric motor for driving the load at high speed, a common source of current for the motors, controlling means adapted to connect the first motor to the source and gradually to increase the voltage of the source and then to lower the voltage of the source and connect the second motor thereto, a device adapted to prevent a sudden operation of said controlling means in changing from one motor to the other, and means controlled by said device for connecting the second motor to the source independently of said controlling means.

6. In combination with a load to be driven, an electric motor for driving the load at low speed, a second electric motor for driving the load at high speed, a common source of current for the motors, a controlling switch adapted to connect the first motor to the source and gradually increase the voltage of the source and then to lower the voltage of the source and connect the second motor thereto, a magnet connected in shunt to said source controlling the movement of said switch in changing from one motor to the other, and contacts controlled by said magnet for connecting the second motor to the source independently of said switch.

7. In combination with a load to be driven, an electric motor for driving the load at low speed, a second electric motor for driving the load at high speed, a common source of current for the motors, a controlling switch adapted to connect the first motor to the source and gradually to increase the voltage of the source and then to lower the voltage of the source and connect the second motor thereto, a device controlled by the voltage of the source controlling the movement of said switch in changing from one motor to the other, and contacts controlled by said device for connecting the second motor to the source independently of said switch.

8. In combination with a load to be driven, an electric motor for driving the load at low speed, a second electric motor for driving the load at high speed, a common source of current for the motors, a controlling switch adapted to connect the first motor to the source and gradually to increase the voltage of the source and then to lower the voltage of the source and connect the second motor thereto, a device adapted to prevent a sudden movement of said switch in changing from one motor to the other, and contacts controlled by the voltage of the source for connecting the second motor to the source independently of said switch.

9. In combination with a load to be driven, an electric motor for driving the load at low speed, a second electric motor for driving the load at high speed, a common source of current for the motors, a controlling switch adapted to connect the first motor to the source and gradually to increase the voltage of the source and then to lower the voltage to the source and connect the second motor thereto, a magnet connected in shunt to said source, a lock controlled by said magnet adapted to engage said switch when said switch is moved to change from one motor to the other, and contacts controlled by the voltage of the source for connecting the second motor to the source independently of said switch.

10. In combination with a load to be driven, an electric motor for driving the load at low speed, a second electric motor for driving the load at high speed, a generator for supplying current to said motors, controlling means adapted to connect the first motor to the generator and gradually to strengthen the field of the generator and then to weaken said field and to connect the second motor to the generator, and means for preventing a sudden operation of said controlling means in changing from one motor to the other.

11. In combination with a load to be driven, an electric motor for driving the load at low speed, a second electric motor for driving the load at high speed, a generator for supplying current to said motors, a controlling switch to connect the first motor to the generator and gradually to strengthen the field of the generator and then to weaken said field and to connect the second motor to the generator, a magnet connected in shunt to the generator armature, and a lock controlled by said magnet adapted to engage said switch when said switch is moved to change from one motor to the other.

12. In combination with a load to be driven, an electric motor for driving the load at low speed, a second electric motor for driving the load at high speed, a generator for supplying current to said motors, a controlling switch adapted to connect the first motor to the generator and gradually to strengthen the field of the generator and then to weaken said field and to connect the second motor to the generator, means for preventing a sudden movement of said switch in changing from one motor to the other, and contacts controlled by the generator voltage for connecting the second motor to the generator independently of said switch.

In witness whereof, I have hereunto set my hand this 5th day of April, 1907.

WILBUR L. MERRILL.

Witnesses:
BENJAMIN B. HULL,
HELEN ORFORD.